United States Patent
Wang et al.

(10) Patent No.: US 7,924,020 B2
(45) Date of Patent: Apr. 12, 2011

(54) FREE-STATE MODAL FREQUENCY RESPONSE TESTING

(75) Inventors: Yuqi Wang, Singapore (SG); YiRen Hong, Singapore (SG); Takkoon Ooi, Singapore (SG); YiChao Ma, Singapore (SG); Kok Tong Soh, Singapore (SG); MingChou Lin, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 649 days.

(21) Appl. No.: 11/856,642

(22) Filed: Sep. 17, 2007

(65) Prior Publication Data

US 2009/0076752 A1    Mar. 19, 2009

(51) Int. Cl.
*G01R 31/08* (2006.01)
*G01R 27/26* (2006.01)
*G01R 27/08* (2006.01)

(52) U.S. Cl. .................. 324/520; 324/681; 324/707
(58) Field of Classification Search .......... 324/520, 324/681, 707
See application file for complete search history.

(56) References Cited

U.S. PATENT DOCUMENTS

| | | | | |
|---|---|---|---|---|
| 2,265,011 | A | * 12/1941 | Siegel | 73/382 R |
| 3,911,731 | A | * 10/1975 | Walker et al. | 73/660 |
| 5,679,899 | A | 10/1997 | Webster et al. | |
| 5,821,424 | A | * 10/1998 | Rodriguez | 73/657 |
| 5,949,342 | A | * 9/1999 | Frary et al. | 340/665 |
| 6,663,575 | B2 | 12/2003 | Leysieffer | |
| 6,972,846 | B2 | 12/2005 | Lal | |
| 7,040,162 | B2 | * 5/2006 | Lehureau et al. | 73/504.12 |
| 7,116,426 | B2 | 10/2006 | Lal et al. | |
| 7,201,720 | B2 | 4/2007 | Cuzzani et al. | |
| 7,271,706 | B2 | 9/2007 | Lee | |
| 2002/0115198 | A1 | 8/2002 | Nerenberg et al. | |
| 2007/0018096 | A1* | 1/2007 | Kawakatsu | 250/309 |
| 2007/0064334 | A1* | 3/2007 | Jia et al. | 360/77.02 |
| 2007/0091316 | A1 | 4/2007 | Lal et al. | |
| 2007/0096928 | A1 | 5/2007 | Lee | |

* cited by examiner

*Primary Examiner* — Amy He
(74) *Attorney, Agent, or Firm* — McCarthy Law Group

(57) ABSTRACT

An apparatus and associated method is provided for suspending a test object in a gravitational field from a support member, exciting the test object by noncontactingly engaging it with a predetermined waveform force, and characterizing the test object qualitatively in relation to an observed modal frequency response of the test object to the excitation.

21 Claims, 4 Drawing Sheets

FREE-STATE MODAL FREQUENCY RESPONSE TESTING

BACKGROUND

Market demands have caused successive recent generations of data storage devices to be continually smaller but more capable. That is, consumers today want and get ever-greater storage capacity and processing speed in a smaller package. This dichotomy has been and will continue to be met by designers who factor in higher bit-areal storage densities, faster data transfer speeds, tighter transducer flying heights, and more robust mechanical components.

All these design factors make data storage devices more susceptible to vibration. Vibrations once conveniently ignored for being negligible must now be effectively managed to prevent perturbances that can render position-control systems ineffective due to track misregistration errors and servo tracking errors. For instance, the smaller and stiffer mechanical components in miniaturized assemblies have relatively higher natural frequencies, and as such are more sensitive to external excitation. Testing of such components requires more scrutiny of the modal frequency response in order to successfully design away from resonant frequencies that create such perturbances.

There are generally two categories of previously attempted solutions for measuring a data storage device component's modal frequency response. In the first, an impact hammer is used to excite the test object. In the second, a mechanical shaker device is used to excite the test object. The former disadvantageously does not provide a continuous and stable periodic excitation. The latter disadvantageously distorts the modal frequency response due to the mass loading associated with the requirement of attaching the shaker to the test object, and the fact that the excitation forces are transmitted through the attachment link. What is lacking in the art is an apparatus and method that provides free-state excitation for a modal frequency response analysis. It is to that improvement in the art that the claimed embodiments are directed.

SUMMARY

Claimed embodiments are generally directed to free-state modal frequency response testing of components in a data storage device.

In some embodiments an apparatus and associated method is provided for suspending a test object in a gravitational field from a support member, exciting the test object by noncontactingly engaging it with a predetermined waveform force, and characterizing the test object qualitatively in relation to an observed modal frequency response of the test object to the excitation.

These and various other features and advantages which characterize the claimed embodiments will become apparent upon reading the following detailed description and upon reviewing the associated drawings.

DETAILED DESCRIPTION

Figure 1:
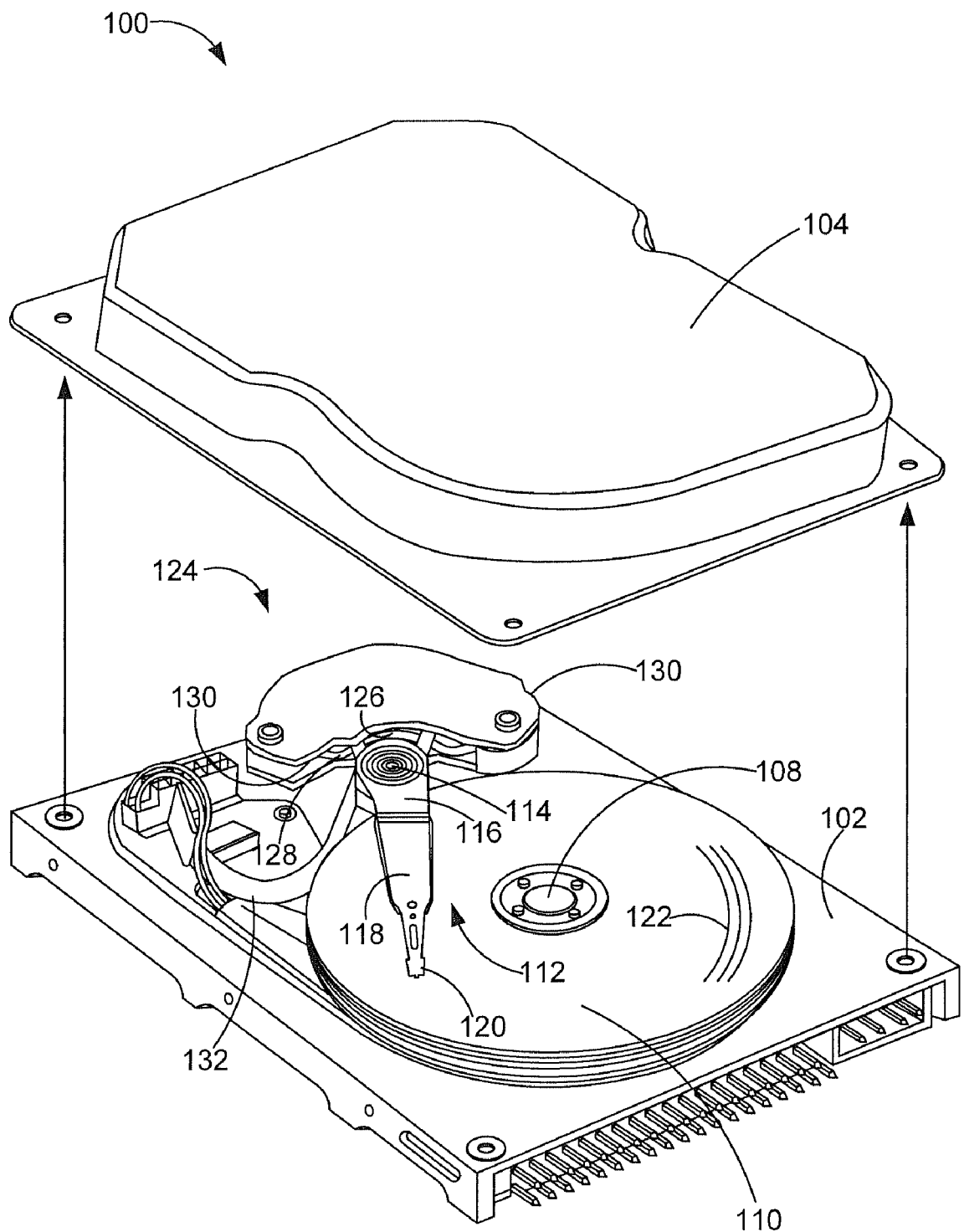
FIG. 1 is a partially exploded isometric view of a data storage device that is well suited for use in practicing the embodiments of the claimed invention.

Referring to the drawings as a whole, and for now in particular to FIG. 1 which is an isometric depiction of a data storage device 100 that is well suited for use in carrying out the claimed embodiments. A base 102 and a cover 104 with a sealing member interposed therebetween provide a sealed enclosure for a number of components. These components include a spindle motor 108 that has one or more data storage mediums (sometimes referred to as "discs") 110 affixed thereto in rotation.

Adjacent the disc 110 is an actuator assembly 112 that is pivotally supported by a cartridge bearing 114. The actuator assembly 112 includes an eblock having a cantilevered actuator arm 116 supporting a load arm 118 that, in turn, supports a read/write transducer (or "head") 120 in a data transfer relationship with the adjacent disc 110.

A recording surface of the disc 110 is divided into a plurality of tracks 122 over which the head 120 is moved. The tracks 122 can have head position control information written to embedded servo sectors. Between the embedded servo sectors are data sectors for storing user data. The head 120 stores input data to the tracks 122 and retrieves output data from the tracks 122. The output data can be previously stored user data or it can be servo data used to position-control the head 120 relative to a desired track 122.

The actuator assembly 112 is positionally controlled by a voice coil motor (VCM) 124 that includes an actuator coil 126 immersed in a magnetic field generated by a magnet assembly 128. A pair of steel plates 130 (pole pieces) mounted above and below the actuator coil 126 provides a magnetically permeable flux path for a magnetic circuit of the VCM 124. During operation of the data storage device 100 current is passed through the actuator coil 126 forming an electromagnetic field, which interacts with the magnetic circuit of the VCM 124, causing the actuator 112 to move the head 120 radially across the disc 110.

To provide the requisite electrical conduction paths between the head 120 and data storage device control circuitry, head wires of the head 120 are affixed to a flex circuit 132. The flex circuit 132 is routed at one end from the load arms 118 along the actuator arms 116, and is secured to a flex connector at the other end. The flex connector supports the flex circuit 132 where it passes through the base 102 and into electrical communication with a printed circuit board assembly ("PCBA"), mounted to the underside of the base 102. A preamplifier/driver (preamp) conditions read/write signals passed between the control circuitry and the head 120.

Figure 2:
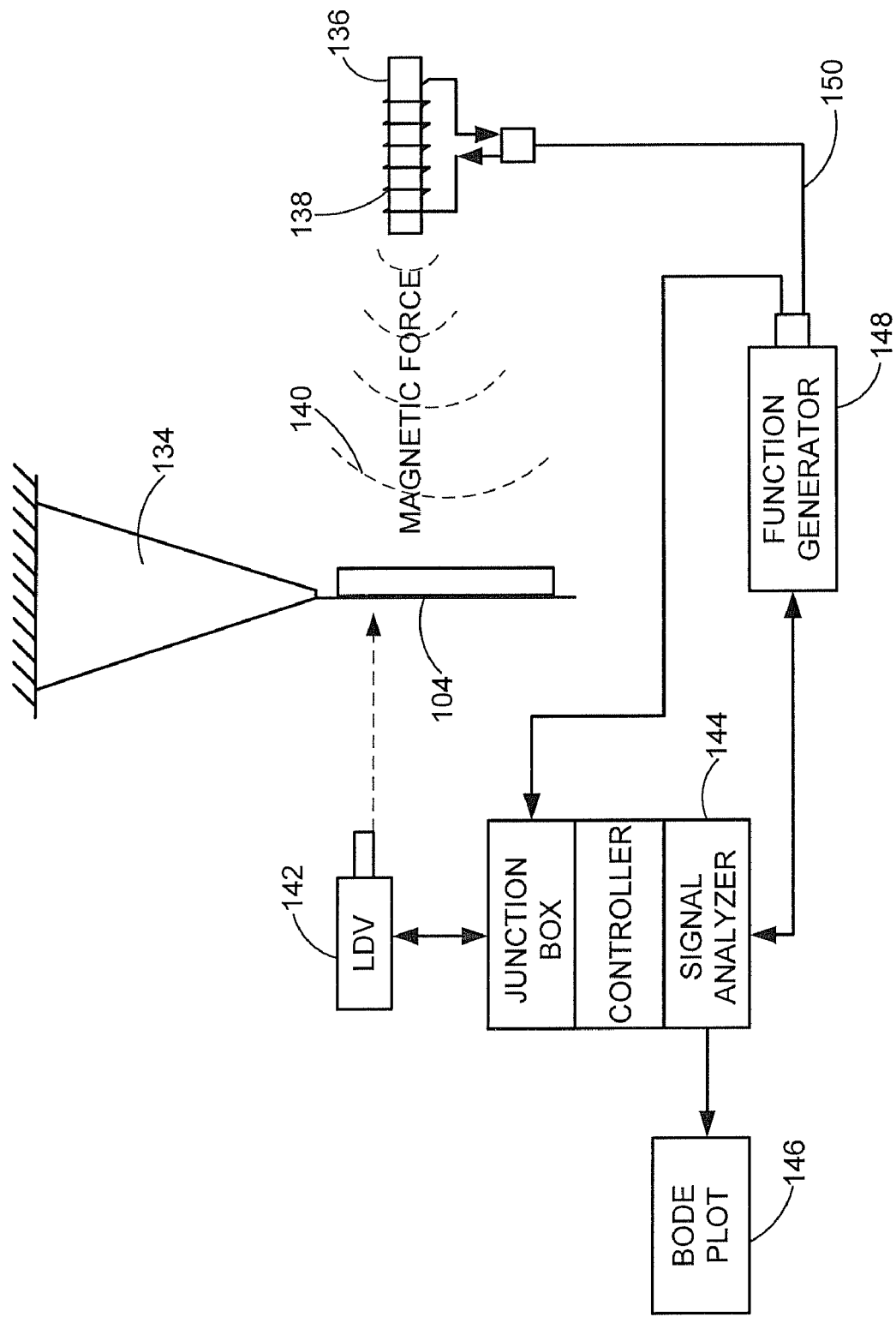
FIG. 2 is a diagrammatic depiction of a test apparatus that is constructed in accordance with embodiments of the claimed invention.

FIG. 2 is a diagrammatic depiction of an apparatus for testing the modal frequency response of the cover 104 (FIG. 1) in accordance with embodiments of the present invention. The apparatus includes a fixture 134 that suspends the cover 104 from one end thereof. The cover 104 is thereby free-hanging from the fixture 134, subject only to a gravitational field. A solenoid 136 is energized by electrically powering a coil 138 having a predetermined number (N) of coil turns. When energized, the solenoid 136 produces a magnetic wave force 140 that excites the cover 104 with a predetermined excitation force.

A motion sensing measurement device, such as a laser Doppler vibrometer ("LDV") 142, detects the resonance response of the cover 104 to the excitation force. The output signal from the LDV, a vibration signature signal, is analyzed by a signal analyzer 144 to provide results in a useful format. In these illustrative embodiments the signal analyzer 144 performs a Fourier transformation on the vibration signature signal from the LDV 142 to produce a mechanical bode plot 146, showing the resonance and phase relationship of the cover 104 in response to the excitation. Measured values can be compared to a predetermined threshold constructed across all frequencies of interest in order to qualitatively characterize a cover 104 under test. A modal frequency response can be performed to qualify the cover 104 in terms of a comparison of the resonant frequency modes in comparison to predetermined frequency ranges that are desirably avoided.

A function generator 148 produces a desired excitation force 140 from the solenoid 136 by varying an excitation signal 150 in terms of an input frequency of an excitation voltage. The magnetic wave force 140, F(x,t), that is generated by the solenoid 136 is a function of time (t) and position (x) as follows:

$$F(x, t) = -\frac{1}{2}\phi^2 \frac{d\mathfrak{R}}{dx} \quad (1)$$

where $\phi$ is the magnetic flux generated by the solenoid and $\mathfrak{R}$ is the reluctance between the solenoid and the cover 104 under test. Reluctance $\mathfrak{R}$ is determined by the distance between the solenoid 136 and the cover 104. It is inversely proportional to the solenoid cross sectional area, A, and the permeability of the air, $\mu_0$, within the solenoid 136:

$$\mathfrak{R} = \frac{x_0 - x}{\mu_0 A} \quad (2)$$

$$\frac{d\mathfrak{R}}{dx} = \frac{-1}{\mu_0 A}$$

By magnetic circuit analogy, magnetic motif force is:

$$Ni = \phi\mathfrak{R} \quad (3)$$

$$\phi = \frac{Ni}{\mathfrak{R}} = \frac{Ni\mu_0 A}{x_0 - x}$$

where N in the number of coil turns and i is the input current into the solenoid 136. By substituting equations (2) and (3) into (1) yields:

$$F(x, t) = \frac{1}{2}\frac{N^2\mu_0 A i^2}{(x_0 - x)^2} \quad (4)$$

V is the input voltage to the solenoid. $V_0$ is the amplitude of the voltage and $\omega$ is the input angular frequency of the voltage:

$$V = V_0 \sin \omega t \quad (5)$$

By analyzing the electric circuit of the solenoid 136, the following relationship is defined:

$$V = L\frac{di}{dt} + iR \quad (6)$$

$$\frac{di}{dt} = \frac{V_0}{L}\sin\omega t - \frac{R}{L}i$$

By solving the first order differential equation (6):

$$i = \left[e^{-\frac{R}{L}t} + \frac{V_0}{L(1+\omega^2)}\sin\omega t - \frac{V_0}{L}\frac{\omega}{(1+\omega^2)}\cos\omega t\right]^2 \quad (7)$$

Substituting equation (7) into (4) yields a relationship used by the function generator 148 to vary the excitation signal 150 in terms of an input frequency of an excitation voltage to produce a desired excitation force:

$$F(x, t) = \frac{N^2\mu_0 A}{2(x_0 - x)^2}\left[e^{-\frac{R}{L}t} + \frac{V_0}{L(1+\omega^2)}\sin\omega t - \frac{V_0}{L}\frac{\omega}{(1+\omega^2)}\cos\omega t\right]^2 \quad (8)$$

Figure 3:
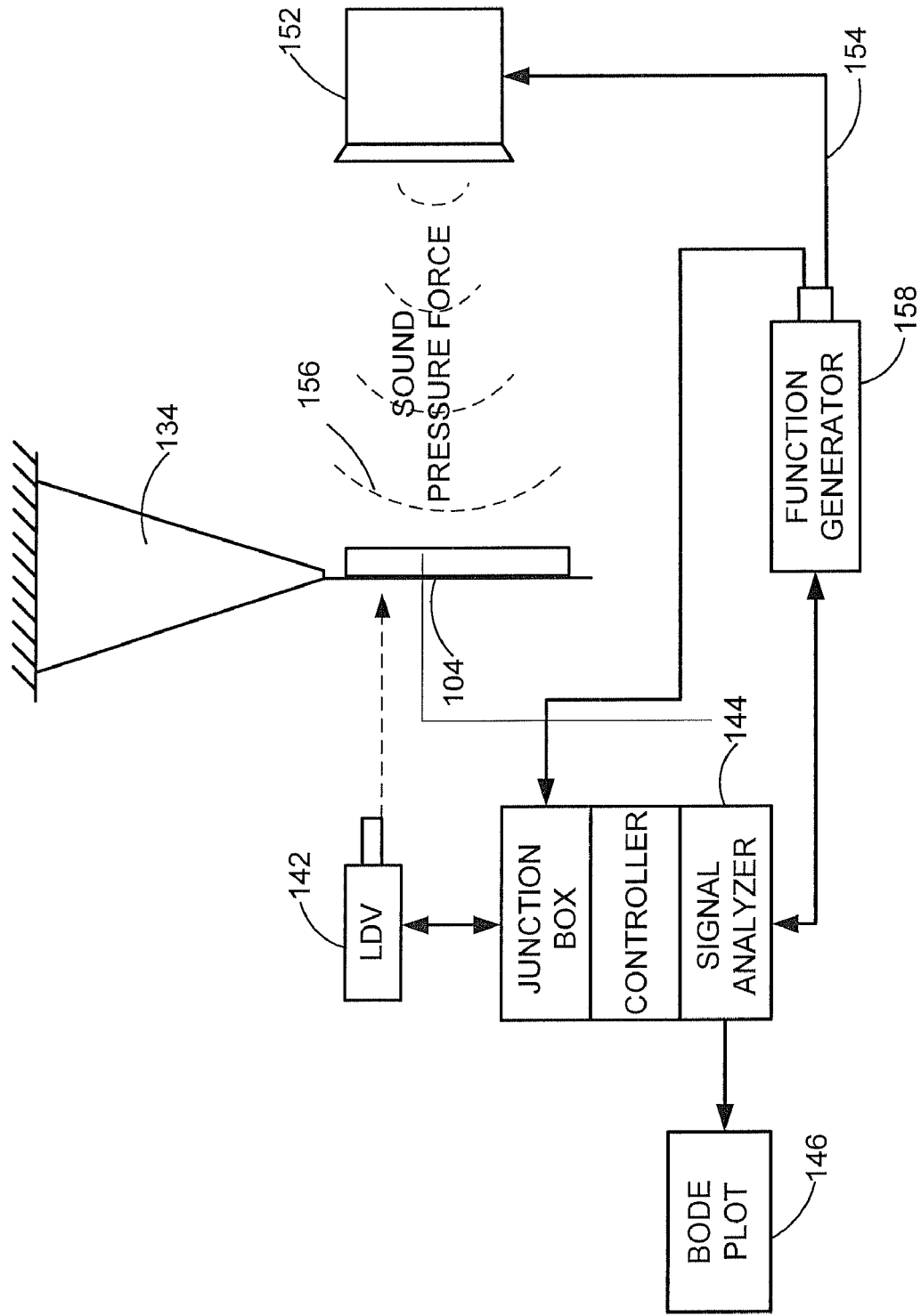
FIG. 3 is a diagrammatic depiction of a test apparatus that is constructed in accordance with alternative embodiments of the claimed invention.

Turning now to FIG. 3 which is a diagrammatic depiction of an apparatus for testing the modal frequency response of the cover 104 (FIG. 1) in accordance with equivalent alternative embodiments of the present invention. As before, the fixture 134 suspends the cover 104 from one end thereof and subjects it to a gravitational field. However, here a cone speaker 152 is energized by an excitation signal 154 to produce an acoustic wave force 156 that excites the cover 104 with a predetermined excitation force.

Also as above, the LDV 142 detects the resonance response of the cover 104 to the excitation force. The vibration signature signal from the LDV 142 is analyzed by the signal analyzer 144 to produce the mechanical bode plot 146.

A function generator 158 produces a desired excitation force 156 from the cone speaker 152 by varying the excitation signal 154 in terms of a sound pressure level, P(r), that is proportional to the excitation voltage. The transient pressure, $p_t(r,t)$, can be expressed as follows:

$$p_t(r,t) = P(r)\cos[2\pi ft + \phi(r)] \quad (1)$$

where f is the acoustic frequency, and $\phi(r)$ is the phase state of the acoustic wave at radius r. A change in frequency f will excite instantaneous sound pressure, which causes energy density change in terms of:

$$e_{\Delta f}(r,t) = p(\Delta f,r,t)^2/\rho c^2 = P(r)^2\cos^2[2\pi\Delta ft + \Delta\phi(r)]/\rho c^2$$

where $\rho$ is the density of air and c is the speed of sound. The acoustic force F(r,t) at an object of area dS with drag coefficient $d_r(r)$ is calculated based on the sound energy density change in Equation (2):

$$F_{\Delta f}(r,t) = d_r(r)dS \times e_{\Delta f}(r,t)$$

or, in terms of the sound pressure, P(r):

$$F_{\Delta f}(r,t) = d_r(r)dS \times P(r)^2\cos^2[2\pi\Delta ft + \Delta\phi(r)]/\rho c^2$$

Generally, the embodiments described contemplate a modal frequency response tester wherein a fixture operably suspends a test object in a gravitational field. The tester also possesses a means for qualitatively characterizing the test object in relation to observing its modal frequency response to a free-state waveform excitation force.

Figure 4:
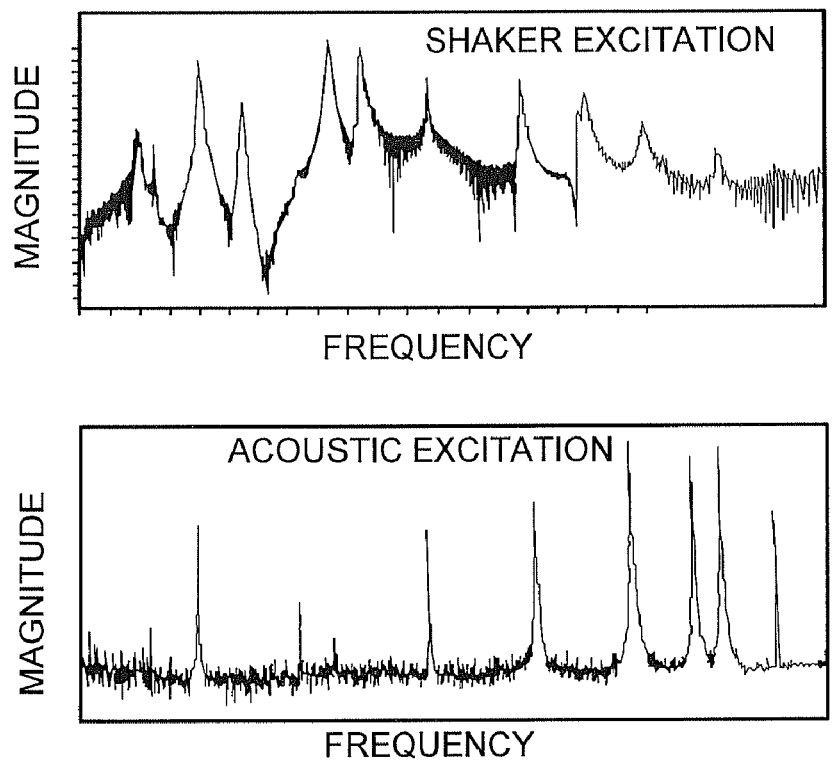
FIG. 4 shows test results comparing modal frequency responses obtained by shaker testing of related art attempted solutions and by acoustic wave force testing of the claimed embodiments.
Figure 5:
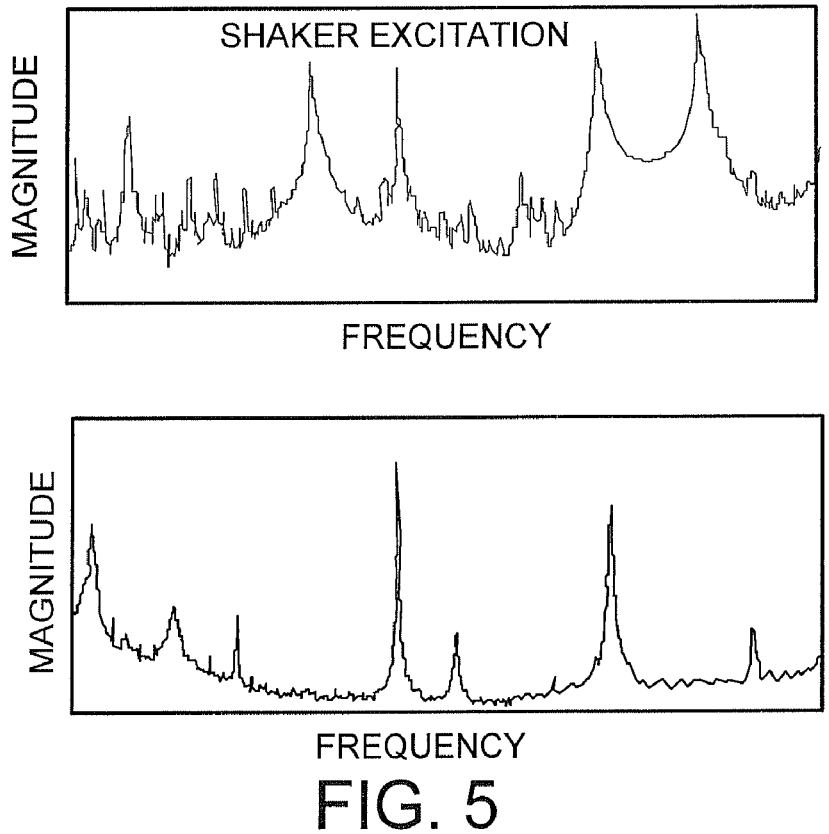
FIG. 5 shows test results comparing modal frequency responses obtained by shaker testing of related art attempted solutions and by magnetic wave force testing of the claimed embodiments.

For purposes of this description and meaning of the appended claims, the phrase "means for qualitatively characterizing" expressly means the structural aspects of the embodiments disclosed herein and the structural equivalents thereof. For example, without limitation, the meaning of "means for qualitatively characterizing" expressly does not include previously attempted solutions that employ a mechanical contacting engagement with the test object to deliver the excitation. FIG. 4, for example, are test results obtained during experimentation comparing the results of shaker testing to that of acoustic testing with the apparatus depicted in FIG. 3. The skilled artisan will note the amount of distortion in the shaker test modal frequency response that is effectively eliminated by the free-state excitation of the claimed embodiments. FIG. 5 likewise shows the elimination of distortion in the modal frequency response by using the magnetic testing apparatus of FIG. 2 in comparison to shaker testing.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to a data storage device, it will be appreciated by those skilled in the art that the claimed subject matter is not so limited and various other applications can utilize the present embodiments without departing from the spirit and scope of the claimed invention.

What is claimed is:

1. A method, comprising:
   suspending a test object in a gravitational field from a support member;
   exciting the test object by noncontactingly engaging it with a predetermined phased waveform force; and
   characterizing the test object qualitatively in relationship to an observed modal frequency response of the test object to the exciting step.

2. The method of claim 1 wherein the characterizing step comprises creating a signature vibration signal from observed vibration in the test object with a laser interferometer.

3. The method of claim 1 wherein the characterizing step comprises creating a signature vibration signal from observed vibration in the test object with a laser Doppler vibrometer.

4. The method of claim 1 wherein the characterizing step comprises analyzing a signature vibration signal to create a bode plot of the frequency response.

5. The method of claim 1 wherein the exciting step comprises aiming magnetic wave forces at the test object.

6. The method of claim 5 wherein the exciting step comprises electrically energizing a solenoid in a presence of the test object.

7. The method of claim 6 comprising a function generator that produces a desired excitation force from the solenoid by varying an excitation signal in terms of an input frequency of an excitation voltage.

8. The method of claim 7 wherein the function generator varies the excitation signal according to the relationship:

$$F(x,t) = \frac{N^2 \mu_0 A}{2(x_0-x)^2}\left[e^{-\frac{R}{L}t} + \frac{V_0}{L(1+\omega^2)}\sin\omega t - \frac{V_0}{L}\frac{\omega}{(1+\omega^2)}\cos\omega t\right]^2.$$

9. The method of claim 7 wherein the function generator varies the excitation signal according to the relationship:

$$F_\Delta(r,t)=d_r(r)dS\times P(r)^2 \cos^2[2\pi\Delta ft+\Delta\phi(r)]/pc^2.$$

10. The method of claim 1 wherein the exciting step comprises aiming acoustic wave forces at the test object.

11. The method of claim 10 wherein the exciting step comprises electrically energizing a cone speaker in a presence of the test object.

12. The method of claim 11 comprising a function generator that produces a desired excitation force from the cone speaker by varying an excitation signal in terms of a sound pressure level associated with an input excitation voltage.

13. An apparatus, comprising:
   a fixture that suspends a test object in a gravitational field;
   a solenoid that noncontactingly excites the test object by imparting a predetermined magnetic wave force to the test object that is generated in relation to varying an input frequency of an excitation voltage to the solenoid; and
   an analyzer that qualitatively characterizes the test object in terms of its modal frequency response to the excitation.

14. The apparatus of claim 13 wherein the analyzer comprises a laser Doppler vibrometer that creates a signature vibration signal, and a signal analyzer that creates a bode plot of the frequency response.

15. The apparatus of claim 13 comprising a function generator that produces a desired excitation force from the solenoid by varying an excitation signal in terms of an input frequency of an excitation voltage.

16. The apparatus of claim 15 wherein the function generator varies the excitation signal to produce a desired magnetic wave force according to the relationship:

$$F(x,t) = \frac{N^2 \mu_0 A}{2(x_0-x)^2}\left[e^{-\frac{R}{L}t} + \frac{V_0}{L(1+\omega^2)}\sin\omega t - \frac{V_0}{L}\frac{\omega}{(1+\omega^2)}\cos\omega t\right]^2.$$

17. An apparatus, comprising:
   a fixture that suspends a test object in a gravitational field;
   a cone speaker that noncontactingly excites the test object by imparting a predetermined acoustic wave force to the test object that is generated in relation to varying a sound pressure level associated with an excitation voltage to the cone speaker; and
   an analyzer that qualitatively characterizes the test object in terms of its modal frequency response to the excitation.

18. The apparatus of claim 17 wherein the analyzer comprises a laser Doppler vibrometer that creates a signature vibration signal, and a signal analyzer that creates a bode plot of the frequency response.

19. The method of claim 18 comprising a function generator that produces a desired excitation force from the cone speaker by varying an excitation signal in terms of a sound pressure level associated with an input excitation voltage.

20. The method of claim 19 wherein the function generator varies the excitation signal to produce a desired acoustic wave force according to the relationship:

$$F_\Delta(r,t)=d_r(r)dS\times P(r)^2 \cos^2[2\pi\Delta ft+\Delta\phi(r)]/pc^2.$$

21. A modal frequency response tester, comprising:
   a fixture that operably suspends a test object in a gravitational field; and
   means for qualitatively characterizing the test object in relation to observing its modal frequency response to a free-state waveform excitation force.

* * * * *